(12) United States Patent
Yau et al.

(10) Patent No.: US 9,282,608 B2
(45) Date of Patent: Mar. 8, 2016

(54) DIMMING DRIVING SYSTEM AND DIMMING CONTROLLER

(71) Applicant: Leadtrend Technology Corp., Hsin-Chu (TW)

(72) Inventors: Yeu-Torng Yau, Hsin-Chu (TW); Kuo-Chien Huang, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 638 days.

(21) Appl. No.: 13/684,172

(22) Filed: Nov. 22, 2012

(65) Prior Publication Data

US 2013/0134904 A1 May 30, 2013

(30) Foreign Application Priority Data

Nov. 24, 2011 (TW) .............................. 100143078 A

(51) Int. Cl.
*H05B 33/08* (2006.01)

(52) U.S. Cl.
CPC ........ *H05B 33/0845* (2013.01); *H05B 33/0815* (2013.01); *Y02B 20/347* (2013.01)

(58) Field of Classification Search
CPC .... H05B 32/07; H05B 33/08; H05B 33/0815; H05B 33/0851; H05B 33/0803
USPC .............. 315/209 R, 274, 291, 297, 307, 308
See application file for complete search history.

(56) References Cited

U.S. PATENT DOCUMENTS

| | | | |
|---|---|---|---|
| 2009/0237007 A1* | 9/2009 | Leng | 315/297 |
| 2011/0227497 A1 | 9/2011 | Hu | |
| 2012/0146530 A1* | 6/2012 | Han et al. | 315/219 |
| 2014/0285103 A1* | 9/2014 | Acharya et al. | 315/206 |

FOREIGN PATENT DOCUMENTS

| | | |
|---|---|---|
| CN | 101489335 A | 7/2009 |
| CN | 102196618 A | 9/2011 |

* cited by examiner

*Primary Examiner* — Thai Pham
(74) *Attorney, Agent, or Firm* — Winston Hsu; Scott Margo

(57) ABSTRACT

Disclosed are dimming driving system and a dimming controller. A disclosed dimming driving system has a transformer, a lighting device, and a dimming controller. The transformer has a primary winding and a secondary winding inductively-coupled to each other. The secondary winding is coupled to an output power line and secondary ground, both coupling to and powering the lighting device. The dimming controller is coupled to the secondary winding for controlling current flowing through the lighting device according to a voltage drop of the secondary winding.

19 Claims, 7 Drawing Sheets

DIMMING DRIVING SYSTEM AND DIMMING CONTROLLER

BACKGROUND OF THE INVENTION

1. Field of the Invention

The present invention relates to a dimming driving system and a dimming controller, and particularly to a dimming driving system and a dimming controller that can accept a plurality of dimming signals.

2. Description of the Prior Art

A light-emitting diode driving circuit with a dimming function needs to have at least three possible dimming manners: a phase truncation (TRIAC) dimming, a pulse-width modulation (PWM) dimming, and an analog level dimming. However, control chips provided by the prior art only can provide one or two of the at least three possible dimming manners.

FIG. 1 is a diagram illustrating a light-emitting diode driving circuit according to the prior art, where the light-emitting diode driving circuit has a flyback topology, a transformer of the light-emitting diode driving circuit has a primary winding PRM, a secondary winding SEC, and a auxiliary winding AUX inductively coupled to each other. As shown in FIG. 1, the transformer roughly separates a primary side circuit from a secondary side circuit, so the primary side circuit and the secondary side circuit are inductively or capacitively coupled to each other, and have a primary side ground wire 22 and a secondary side ground wire 24, respectively. A power factor correction (PFC) controller 26 can control a power switch 34 to turn on/turn off to make the transformer store power/release power. When the transformer releases power, the secondary winding SEC builds an output voltage VDD on an output power line VDD through a rectifier diode.

A series of light-emitting diodes 28 are coupled between the output power line VDD and the secondary side ground wire 24. An operational amplifier 30 can provide a constant voltage feedback mechanism through a photo coupler 36, so an operational voltage VDD does not roughly exceed a value corresponding to a constant voltage reference voltage $V_{REF-CV}$ when the plurality of light-emitting diodes 28 are turned off. An operational amplifier 32 and a current detection resistor RS can provide a constant current feedback mechanism through the photo coupler 36, so the constant current feedback mechanism can make current flowing through the series of light-emitting diodes 28 be roughly equal to a constant current reference voltage $V_{REF-CC}$ dividing by a resistance of the current detection resistor RS when the series of light-emitting diode 28 are turned on.

However, the phase truncation (TRIAC) dimming utilizes a primary side of the light-emitting diode driving circuit to dim the series of light-emitting diodes 28. For example, a voltage divider can make the PFC controller 26 detect an input voltage VIN on an input power line IN. Therefore, the PFC controller 26 can control the current flowing through the series of light-emitting diode 28 at a secondary side of the light-emitting diode driving circuit according to a period ratio of the input voltage VIN being about 0V to the input voltage VIN exceeding 0V. But, control accuracy of the current flowing through the series of light-emitting diode 28 provided by the phase truncation (TRIAC) dimming is not enough, and the phase truncation (TRIAC) dimming can also not provide functions of pulse-width modulation dimming and analog level dimming.

SUMMARY OF THE INVENTION

An embodiment provides a dimming driving system. The dimming driving system includes a transformer, a lighting device, and a dimming controller. The transformer has a primary winding and a secondary winding inductively coupled to each other. The secondary winding coupled between an output power line and secondary ground. The lighting device is powered by the output power line and the secondary ground. The dimming controller is coupled to the secondary winding for controlling current flowing through the lighting device according to a voltage drop of the secondary winding.

Another embodiment provides a dimming controller formed in an integrated circuit chip. The dimming controller includes a phase truncation control pin, a dimming control pin, and a processing circuit. The phase truncation control pin is coupled to a transformer for receiving a sensing signal. The dimming control pin is used for receiving a dimming signal. The processing circuit is coupled between the phase truncation control pin and the dimming control pin for providing a current setting signal. Priority of the dimming signal affecting the current setting signal is higher priority of the sensing signal affecting the current setting signal in the processing circuit. The current setting signal influences current flowing through a lighting device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
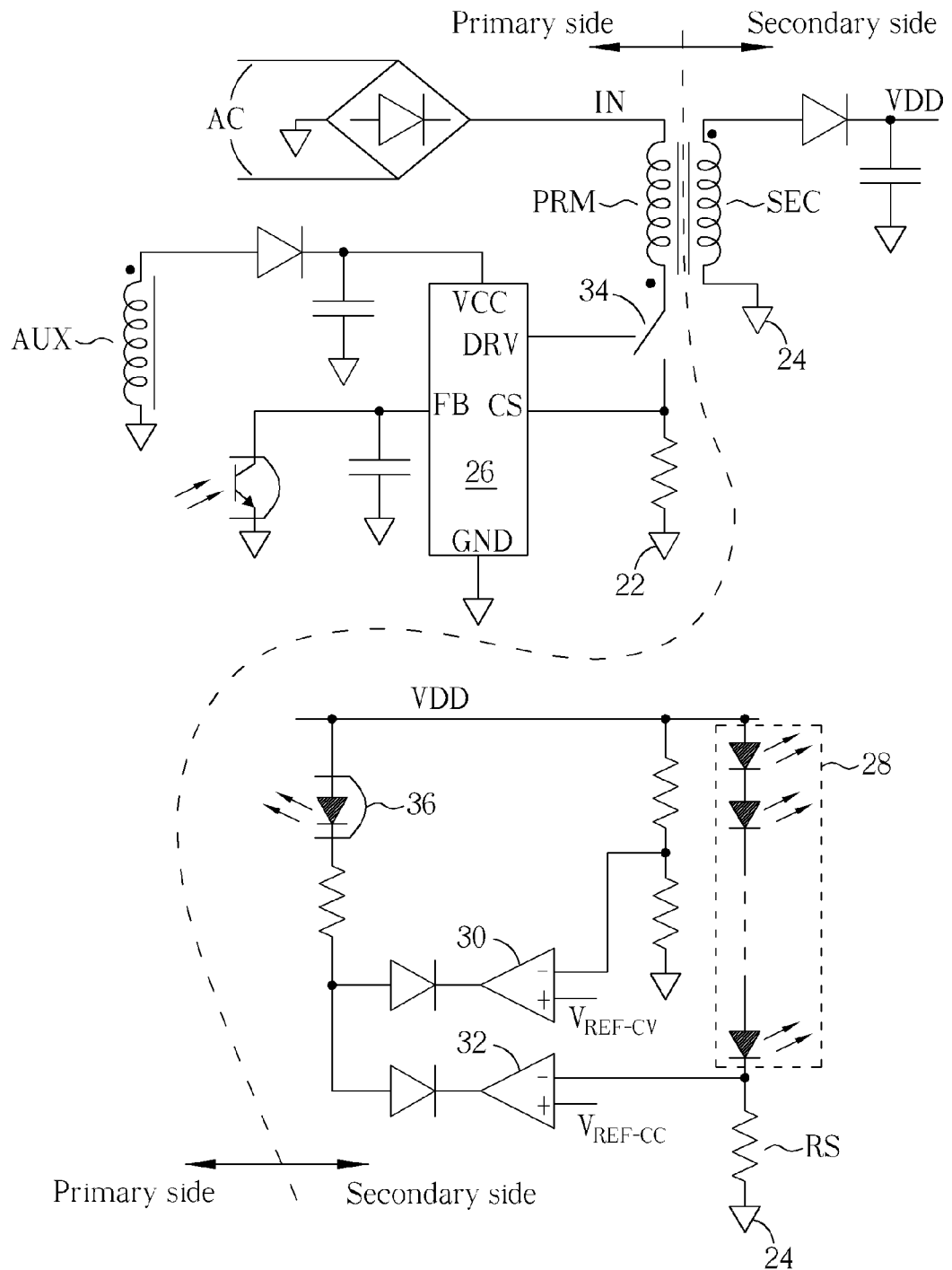
FIG. 1 is a diagram illustrating a light-emitting diode driving circuit according to the prior art.
Figure 2:
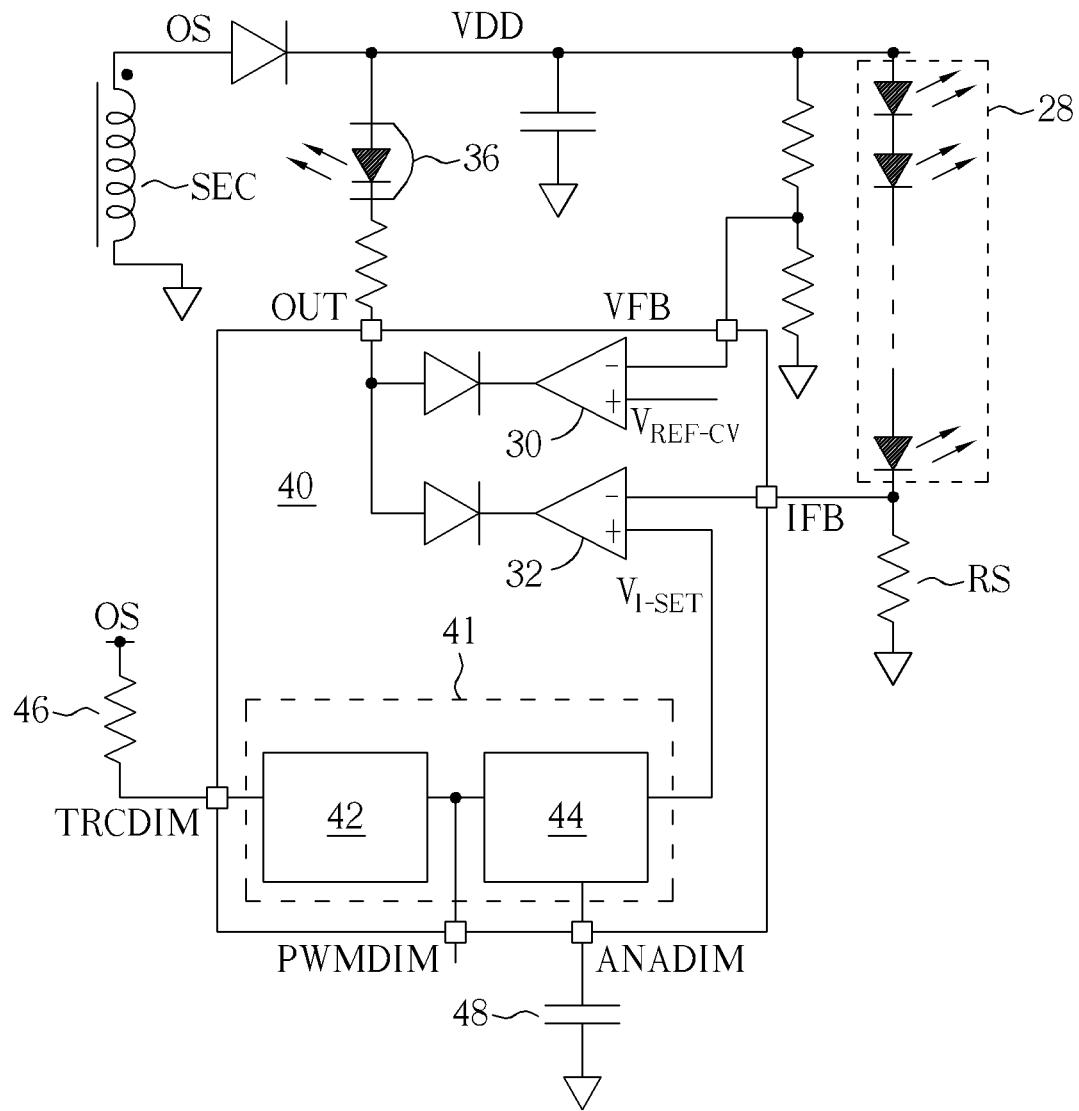
FIG. 2 is a diagram illustrating a secondary side circuit of a light-emitting diode driving circuit according to an embodiment.

FIG. 2 is a diagram illustrating a secondary side circuit of a light-emitting diode driving circuit according to an embodiment, where the secondary side circuit can provide a phase truncation (TRIAC) dimming, a pulse-width modulation (PWM) dimming, and an analog level dimming. A primary side circuit not shown in FIG. 2 can be implemented as the primary side circuit shown in FIG. 1 or other well-known primary side circuits by those of ordinary skill in the art, so further description thereof is omitted for simplicity. As shown in FIG. 2, after current flowing through a secondary winding SEC is rectified by a diode, the current can build an output voltage $V_{DD}$ on an output power line VDD. The output power line VDD and a secondary side ground wire 24 can power a series of light-emitting diodes 28 together.

A dimming controller 40 is shown in FIG. 2. In embodiments of the present invention as follows, the dimming controller 40 is a monolithic integrated circuit chip formed in a monolithic silicon chip. But, the present invention is not limited to the dimming controller 40 being formed in the monolithic silicon chip. That is to say, in another embodiment of the present invention, the dimming controller can be composed of discrete components.

As shown in FIG. 2, the dimming controller 40 includes an output pin OUT, a voltage feedback pin VFB, a current feedback pin IFB, an analog level dimming control pin ANADIM, a pulse width modulation dimming pin PWMDIM, and a phase truncation control pin TRCDIM. Coupling relationships of operational amplifiers 30 and 32 of the dimming controller 40 are similar to those of the operational amplifiers 30 and 32 in FIG. 1, where the operational amplifiers 30 and 32 can act as a feedback circuit to provide similar constant voltage and constant current feedback mechanisms. A current setting signal $V_{I\text{-}SET}$ in FIG. 2 is generated and provided by a processing circuit 41 according to signals of the analog level dimming control pin ANADIM, the pulse width modulation dimming pin PWMDIM, and the phase truncation control pin TRCDIM, so the current setting signal $V_{I\text{-}SET}$ is different from the constant current reference voltage $V_{REF\text{-}CC}$ in FIG. 1. In one embodiment of the present invention, the current setting signal $V_{I\text{-}SET}$ is about an analog voltage signal having a maximum value 350 mV and a minimum value 0 mV. In another embodiment of the present invention, the current setting signal $V_{I\text{-}SET}$ is a digital signal voltage signal. When the current setting signal $V_{I\text{-}SET}$ is a logic value "1", the current setting signal $V_{I\text{-}SET}$ has a voltage value 350 mV; when the current setting signal $V_{I\text{-}SET}$ is a logic value "0", the current setting signal $V_{I\text{-}SET}$ has a voltage value 0 mV.

In FIG. 2, the phase truncation dimming can be implemented through pins of the dimming controller 40 being connected to external devices. In addition, the dimming controller 40 can also implement other dimming functions explained later.

The processing circuit 41 includes a dimming phase detection circuit 42 and a reference signal providing circuit 44. In FIG. 2, the dimming phase detection circuit 42 is coupled to the secondary winding SEC through a resistor 46. The pulse width modulation dimming pin PWMDIM of the dimming controller 40 is floating and not connected to an external device. The analog level dimming control pin ANADIM is coupled to a capacitor 48. The dimming phase detection circuit 42 can generate a digital signal $S_{PWMDIM}$ at the pulse width modulation dimming pin PWMDIM according to a voltage of the secondary winding SEC. The reference signal providing circuit 44 can provide the current setting signal $V_{I\text{-}SET}$ according to the digital signal $S_{PWMDIM}$.

Figure 3:
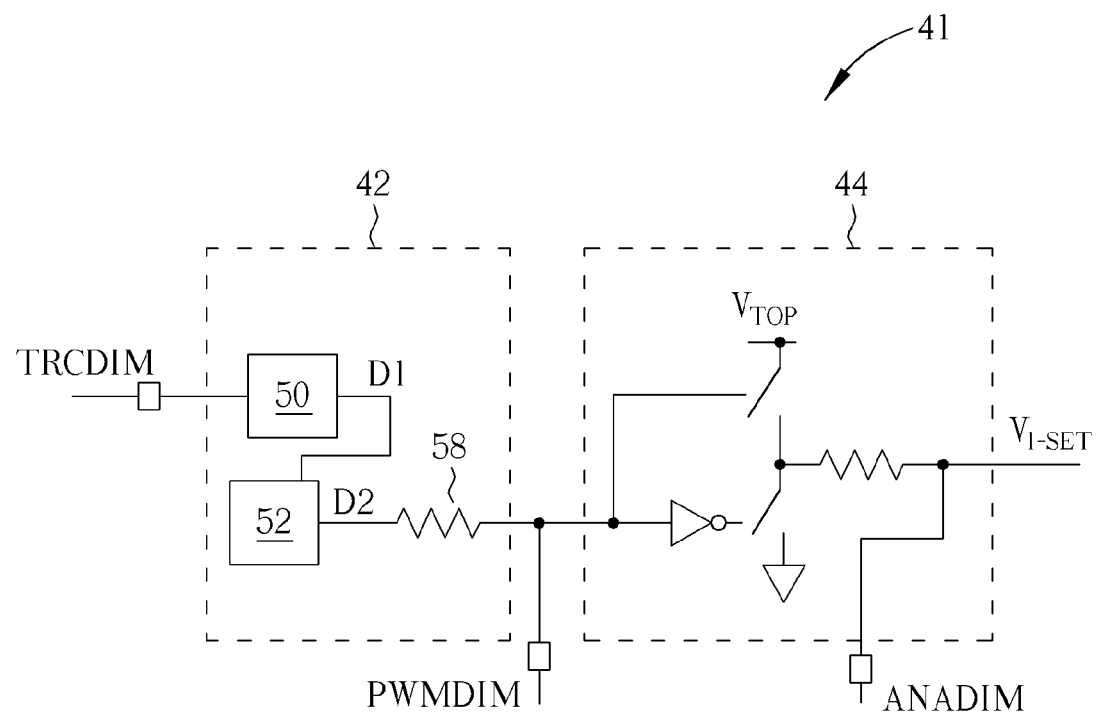
FIG. 3 is a diagram illustrating an inner circuit of the processing circuit according to one embodiment.
Figure 4:
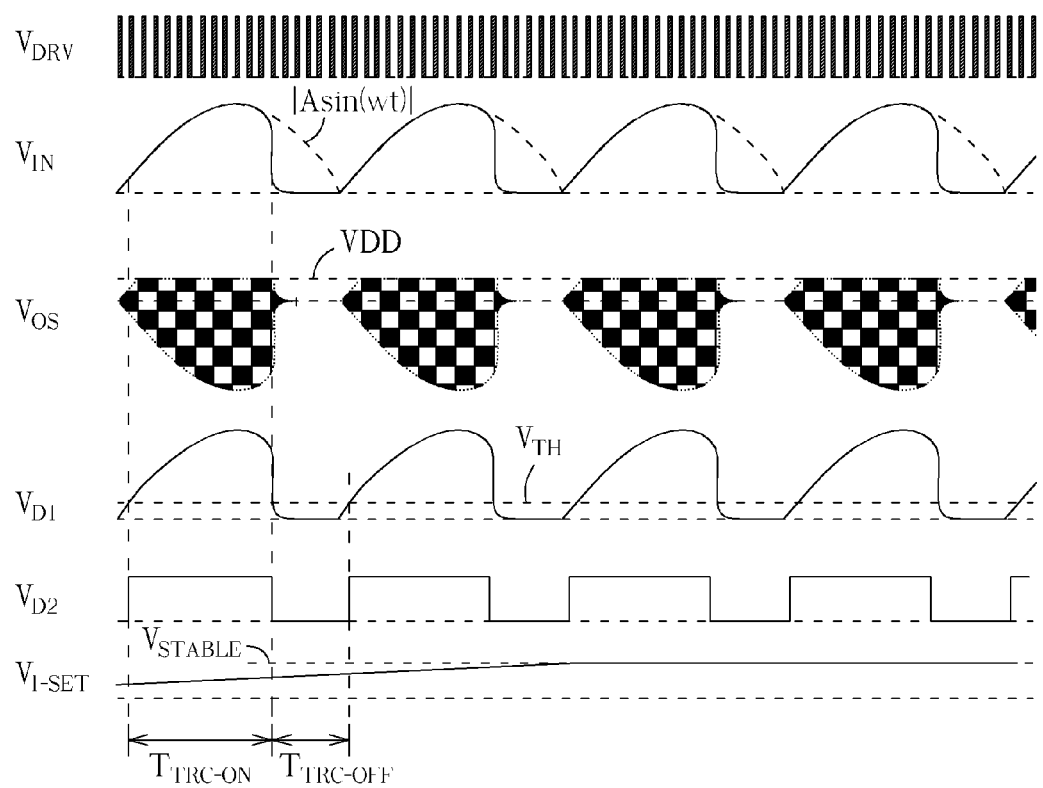
FIG. 4 is a diagram illustrating signal waveforms in FIG. 1, FIG. 2, and FIG. 3.

FIG. 3 is a diagram illustrating an inner circuit of the processing circuit 41 according to one embodiment, and FIG. 4 is a diagram illustrating signal waveforms in FIG. 1, FIG. 2, and FIG. 3. From top to down, the signal waveforms in FIG. 4 correspond to a driving signal $V_{DRV}$ at the driving terminal DRV in FIG. 1, the input voltage $V_{IN}$ at the input power line IN in FIG. 1, a voltage $V_{OS}$ at a terminal OS of the secondary winding SEC in FIG. 2, a signal $V_{D1}$ at a terminal D1 in FIG. 3, a signal $V_{D2}$ at a terminal D2 in FIG. 3, and the current setting signal $V_{I\text{-}SET}$ in FIG. 3.

The PFC controller 26 in FIG. 1 can turn on and off the power switch 34 form the driving terminal DRV according to the driving signal $V_{DRV}$. As shown in FIG. 4, a voltage value of the input voltage $V_{IN}$ roughly varies with a rectified sinuous wave, but the voltage value of the input voltage $V_{IN}$ is quickly reduced to 0V in one phase due to the phase truncation dimming.

When the power switch 34 is turned on, the voltage $V_{OS}$ (equal to a voltage drop of the secondary winding SEC) is a reflected voltage with a negative value rough proportion to a voltage drop of the primary winding PRM (that is, the input voltage $V_{IN}$) in FIG. 1. When the power switch 34 is turned off and the transformer is discharged, the secondary winding SEC charges the output power line VDD, so the voltage $V_{OS}$ can be roughly clamped at the output voltage $V_{DD}$. Therefore, as shown in FIG. 4, the voltage $V_{OS}$ can vary up and down, be roughly limited to at the output voltage $V_{DD}$, and be proportion to a negative value of the input voltage $V_{IN}$.

A circuit 50 in FIG. 3 is used for roughly capturing a negative value of the voltage $V_{OS}$ to convert to a positive value through the phase truncation control pin TRCDIM, and functioning as a low-pass filter to filter the voltage $V_{OS}$ to generate the signal $V_{D1}$ at the terminal D1 simultaneously. As shown in FIG. 4, the waveform of the signal $V_{D1}$ roughly reproduces the waveform of the input voltage $V_{IN}$. In FIG. 2, a resistance of the resistor 46 between the secondary winding SEC and the phase truncation control pin TRCDIM can be used for determining a voltage ratio of the signal $V_{D1}$ to the input voltage $V_{IN}$.

Because the signal $V_{D1}$ is roughly the input voltage $V_{IN}$, a circuit 52 in FIG. 3 can roughly determine a power-on period $T_{TRC\text{-}ON}$ and a power-off period $T_{TRC\text{-}OFF}$ defined by the phase truncation dimming manner. For example, the circuit 52 can be a comparator for comparing the signal $V_{D1}$ with a threshold value $V_{TH}$, and generating a digital signal $V_{D2}$ at the terminal D2 according to a determination result. As shown in FIG. 4, when the pulse width modulation dimming pin PWMDIM is floating, the digital signal $S_{PWMDIM}$ of the pulse width modulation dimming pin PWMDIM is roughly equal to the digital signal $V_{D2}$.

In another embodiment of the present invention, the dimming phase detection circuit 42 can determine the power-on period $T_{TRC\text{-}ON}$ and the power-off period $T_{TRC\text{-}OFF}$ defined by the phase truncation dimming according to an internal period between two consecutive negative values of the voltage $V_{OS}$. For example, when the dimming phase detection circuit 42 determines that the voltage $V_{OS}$ is not the negative value for a predetermined time (such as 500 ns) through the phase truncation control pin TRCDIM, the dimming phase detection circuit 42 can determine the secondary side is in the power-off period $T_{TRC\text{-}OFF}$, resulting in the dimming phase detection circuit 42 making the digital signal $V_{D2}$ be the logic value "0"; otherwise, the dimming phase detection circuit 42 determines the secondary side is in the power-on period $T_{TRC\text{-}ON}$, then the dimming phase detection circuit 42 can make the digital signal $V_{D2}$ be the logic value "1". The predetermined time is at least a maximum switching period of the power switch 34 of the primary side. That is to say, after the power switch 34 experiences a switching period, if the voltage $V_{OS}$ is not the negative value, the input voltage $V_{IN}$ is roughly equal to 0V, so the secondary side is in the power-off period $T_{TRC\text{-}OFF}$ dimmed by the phase truncation dimming.

When the analog level dimming control pin ANADIM is coupled to an external capacitor. As shown in the embodiment in FIG. 2, the reference signal providing circuit 44 in FIG. 3 can function as a low-pass filter for filtering the digital signal $S_{PWMDIM}$ to provide the current setting signal $V_{I\text{-}SET}$. In the embodiment in FIG. 3, a stable value $V_{STABLE}$ approached by the current setting signal $V_{I-SET}$ can be calculated by equation I:

$$V_{STABLE} = V_{TOP} * T_{TRC-ON}/(T_{TRC-ON} + T_{TRC-OFF}) \quad \text{I}$$

As shown in equation I, $V_{TOP}$ shown in FIG. 3 has a predetermined voltage value, such as 350 mV. As shown in FIG. 4, finally, the current setting signal $V_{I-SET}$ is roughly stabled at the stable value $V_{STABLE}$.

As shown in FIG. 2, the current setting signal $V_{I-SET}$ can roughly control the current flowing through the series of light-emitting diodes 28 through the constant current feedback mechanism. The current setting signal $V_{I-SET}$ roughly corresponds to filtered results of the power-on period $T_{TRC-ON}$ and the power-off period $T_{TRC-OFF}$ defined by the phase truncation dimming, so the dimming controller 40 can implement the phase truncation dimming.

Figure 5:
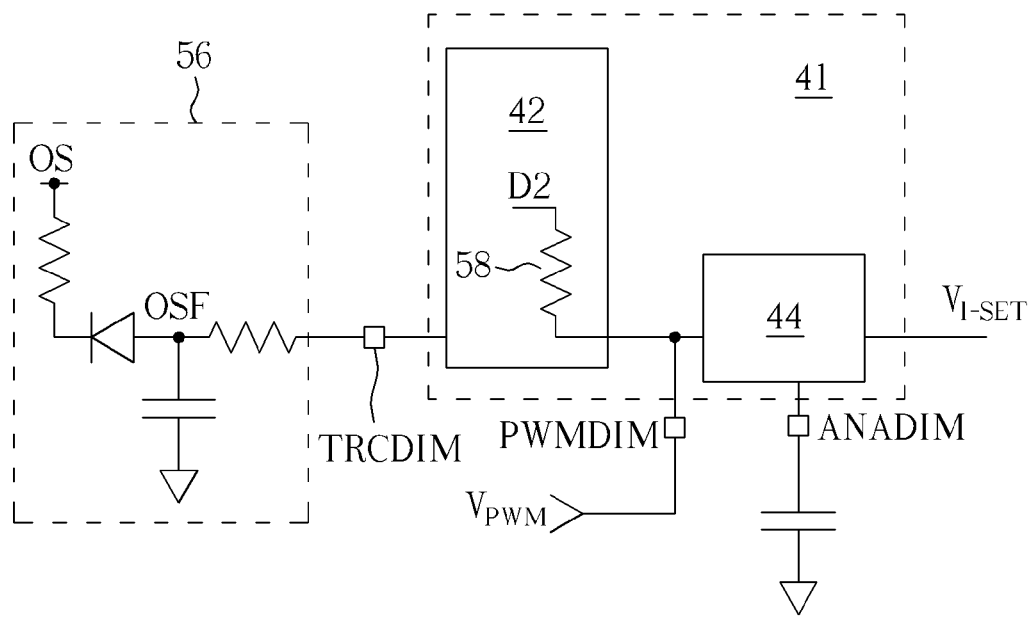
FIG. 5 is a diagram illustrating coupling relationships between the pins of the dimming controller and external devices according to another embodiment.

FIG. 5 is a diagram illustrating coupling relationships between the pins of the dimming controller 40 and external devices according to another embodiment, where the embodiment in FIG. 5 can implement the PWM dimming. In one embodiment, a circuit 56 can optionally substitute the resistor 46 in FIG. 2 for prohibiting the phase truncation dimming. The circuit 56 has a negative voltage low-pass filter which can roughly maintain a voltage $V_{OSF}$ of a terminal OSF at a negative value according to variation of the input voltage $V_{IN}$ to make the dimming phase detection circuit 42 persistently determine the secondary side is in the power-on period $T_{TRC-ON}$, resulting in the phase truncation dimming being prohibited. An external digital PWM dimming signal $V_{PWM}$ can be inputted in the pulse width modulation dimming pin PWMDIM. A low-pass filtered result of the PWM dimming signal $V_{PWM}$ generates the current setting signal $V_{I-SET}$ which has a voltage level roughly corresponding to a duty cycle of the PWM dimming signal $V_{PWM}$. As shown in FIG. 5, priority of the PWM dimming signal $V_{PWM}$ affecting the current setting signal $V_{I-SET}$ is higher priority of the digital signal $V_{D2}$ of the terminal D2 affecting the current setting signal $V_{I-SET}$ due to a function of a resistor 58.

Figure 6:
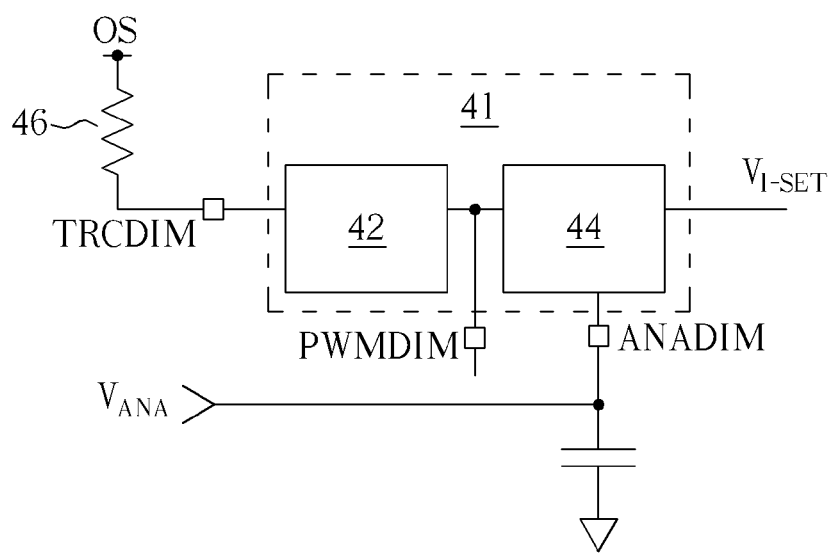
FIG. 6 is a diagram illustrating coupling relationships between the pins of the dimming controller and external devices according to another embodiment

FIG. 6 is a diagram illustrating coupling relationships between the pins of the dimming controller 40 and external devices according to another embodiment, where the embodiment in FIG. 6 can implement the analog level dimming. In the embodiment in FIG. 6, the resistor 46 exists between the phase truncation control pin TRCDIM and the terminal OS of the secondary winding SEC, the pulse width modulation dimming pin PWMDIM is floating, and an external analog dimming signal $V_{ANA}$ is directly inputted in the analog dimming control pin ANADIM to act as the current setting signal $V_{I-SET}$. As shown in FIG. 6, as long as the analog dimming signal $V_{ANA}$ is inputted, the current setting signal $V_{I-SET}$ is equal to the analog dimming signal $V_{ANA}$ regardless of signals of the phase truncation control pin TRCDIM and the pulse width modulation dimming pin PWMDIM. To sum up, priority order of affecting the current setting signal $V_{I-SET}$ is the analog dimming signal $V_{ANA}$, a signal of the pulse width modulation dimming pin PWMDIM, and a signal of the phase truncation control pin TRCDIM in sequence.

Figure 7:
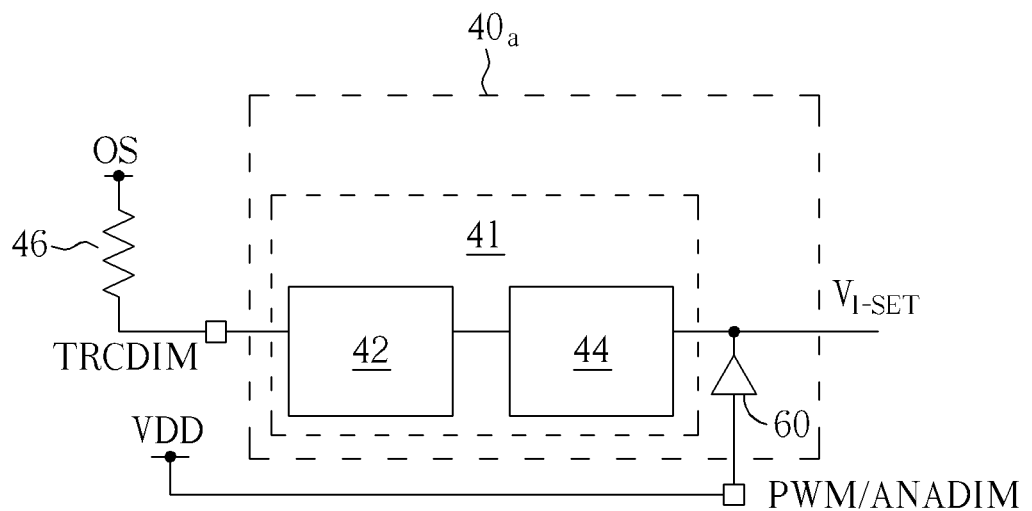
FIG. 7 is a diagram illustrating a dimming controller $40_a$ which can provide the phase truncation (TRIAC) dimming through a pin TRCDIM.

However, a dimming controller according to another embodiment does not need three pins to provide the phase truncation (TRIAC) dimming, the PWM dimming, and the analog level dimming. Please refer to FIG. 7. FIG. 7 is a diagram illustrating a dimming controller 40a which can provide the phase truncation (TRIAC) dimming, the PWM dimming, and the analog level dimming through a pin TRCDIM and a pin PWM/ANADIM.

In FIG. 7, the phase truncation dimming can be implemented through the pins of the dimming controller $40_a$ being connected to external devices. The dimming controller $40_a$ can also implement other dimming functions explained later.

The processing circuit 41 of the dimming controller $40_a$ is described in previous embodiments of the present invention, so further description thereof is omitted for simplicity. The dimming controller $40_a$ has a buffer 60. An input of the buffer 60 is connected to the pin PWM/ANADIM, and a current setting signal $V_{I-SET}$ generated by the buffer 60 can be outputted through an output of the buffer 60. In the embodiment in FIG. 7, when a voltage of an input signal of the pin PWM/ANADIM exceeds a predetermined voltage value, the buffer 60 does not have driving capability, resulting in the current setting signal $V_{I-SET}$ is completely determined by the processing circuit 41. When the voltage of the input signal of the pin PWM/ANADIM is within a predetermined range, the buffer 60 has a powerful driving capability, resulting in the buffer 60 dominating the current setting signal $V_{I-SET}$ to make the current setting signal $V_{I-SET}$ be not influenced by the processing circuit 41. For example, when the voltage of the input signal of the pin PWM/ANADIM exceeds 400 mV, the buffer 60 does not have driving capability; when the voltage of the input signal of the pin PWM/ANADIM is within 0V and 350 mV, a voltage of the current setting signal $V_{I-SET}$ is about equal to a voltage of the pin PWM/ANADIM.

In FIG. 7, when the voltage of the pin PWM/ANADIM is about equal to a voltage of the power line VDD (exceeding 400 mV), the buffer 60 has no function. Therefore, the processing circuit 41 can detect a phase of the input voltage $V_{IN}$ through the pin TRCDIM and the secondary winding SEC to determine the power-on period $T_{TRC-ON}$ and the power-off period $T_{TRC-OFF}$, and can function as a low-pass filter to generate the current setting signal $V_{I-SET}$. Thus, the embodiment in FIG. 7 can implement the phase truncation dimming.

Figure 8:
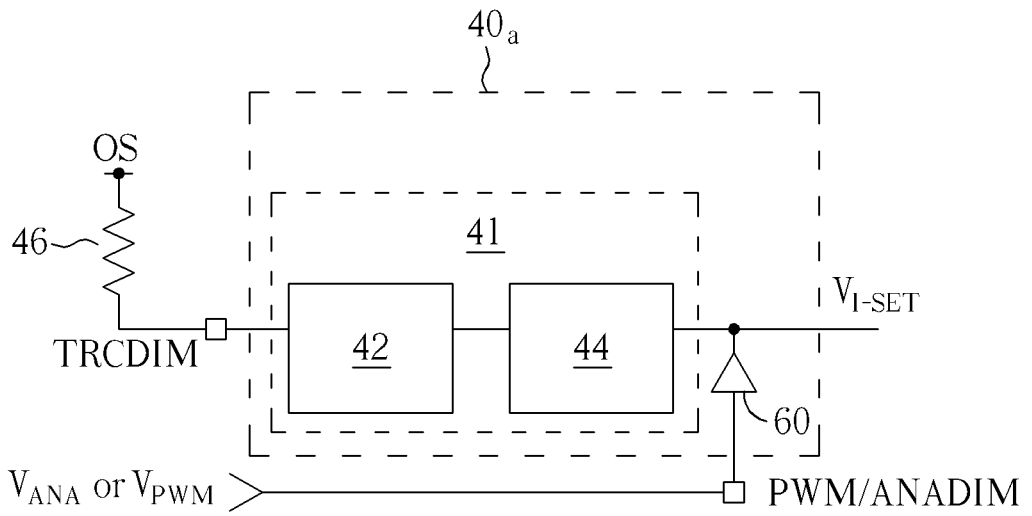
FIG. 8, FIG. 9, and FIG. 10 are diagrams illustrating that the PWM dimming and the analog level dimming can be implemented through the pins of the dimming controller being connected to external devices.

FIG. 8 is a diagram illustrating that the PWM dimming and the analog level dimming can be implemented through the pins of the dimming controller $40_a$ being connected to external devices. A PWM dimming signal $V_{PWM}$ or an analog dimming signal $V_{ANA}$ are directly inputted in the pin PWM/ANADIM. As long as a voltage level of the PWM dimming signal $V_{PWM}$ or the analog dimming signal $V_{ANA}$ is within 0V and 350 mV, the current setting signal $V_{I-SET}$ corresponds exactly to the PWM dimming signal $V_{PWM}$ and the analog dimming signal $V_{ANA}$. When the pin PWM/ANADIM receives the analog dimming signal $V_{ANA}$, a voltage level of analog dimming signal $V_{ANA}$ is equal to set a current flowing through the series of light-emitting diodes 28 to achieve the analog level dimming; when the pin PWM/ANADIM receives the PWM dimming signal $V_{PWM}$, a PFC power supply composed of the PFC controller 26 and peripheral circuits (the PFC power supply has 10 to 16 Hz closed-loop bandwidth) can filter the PWM dimming signal $V_{ANA}$ to make the current flowing through the series of light-emitting diodes 28 be roughly maintain a dimmed value regardless of the current setting signal $V_{I-SET}$ being a corresponding digital signal. Thus, the embodiment in FIG. 8 can implement the PWM dimming.

Figure 9:
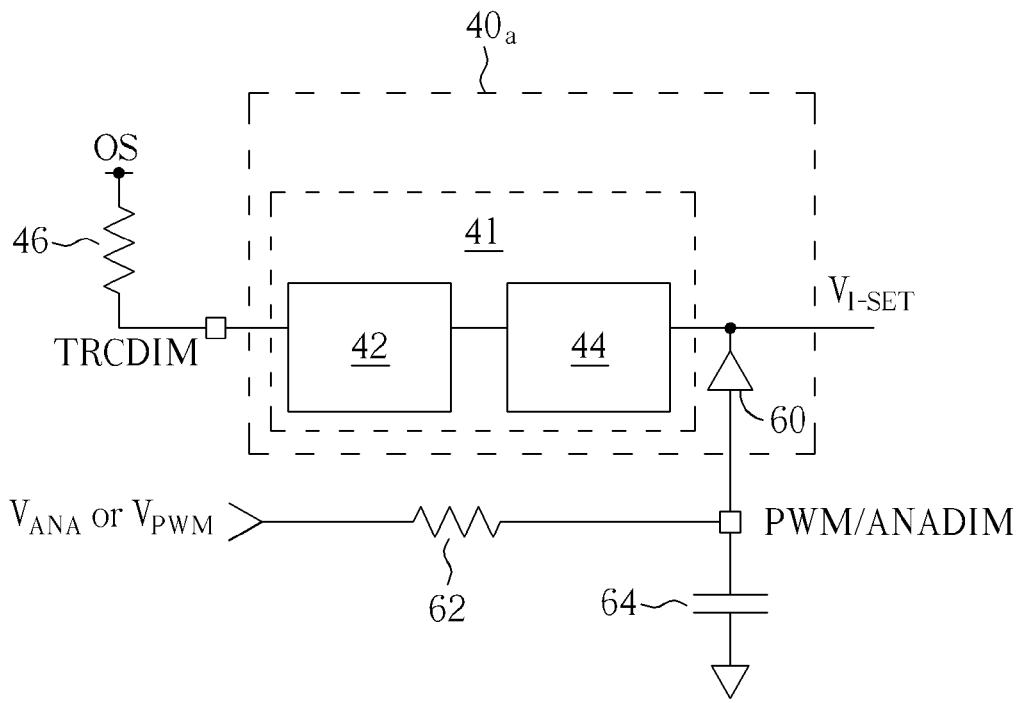

FIG. 9 is a diagram illustrating that the PWM dimming and the analog level dimming can be implemented through the pins of the dimming controller $40_a$ being connected to external devices. In FIG. 9, a resistor 62 and a capacitor 64 coupled to the pin PWM/ANADIM can function as a low-pass filter. When a digital PWM dimming signal $V_{PWM}$ is inputted in a terminal of the resistor 62, the pin PWM/ANADIM has a corresponding analog dimming signal to achieve the same PWM dimming. In addition, Further, subsequent operational principles of an analog dimming signal $V_{ANA}$ being inputted in the terminal of the resistor 62 are the same as those of the embodiment in FIG. 8, so further description thereof is omitted for simplicity.

Figure 10:
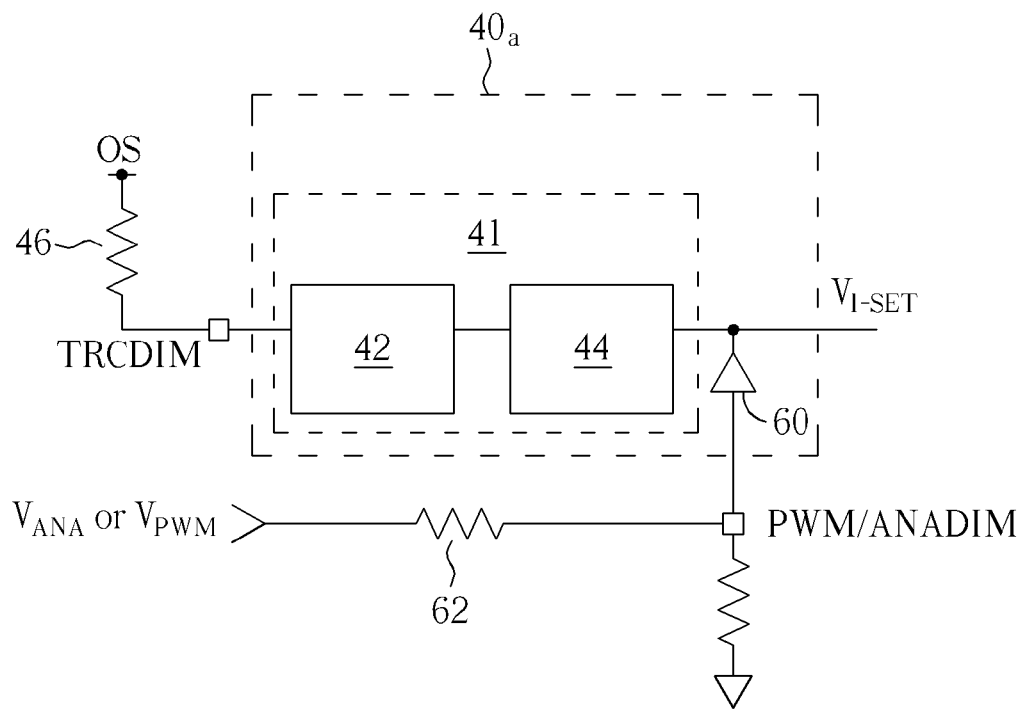

FIG. 10 is a diagram illustrating that the PWM dimming and the analog level dimming can be implemented through the pins of the dimming controller 40$_a$ being connected to external devices. When voltage levels of a PWM dimming signal V$_{PWM}$ and an analog dimming signal V$_{ANA}$ provided by a signal source exceed a range which can be accepted by the buffer 60, voltage levels of the PWM dimming signal V$_{PWM}$ and the analog dimming signal V$_{ANA}$ need to be reduced, then the reduced PWM dimming signal V$_{PWM}$ and the reduced analog dimming signal V$_{ANA}$ just can be inputted in the pin PWM/ANADIM. Therefore, two resistors in FIG. 10 are used for reducing the PWM dimming signal V$_{PWM}$ or the analog dimming signal V$_{ANA}$ to provide a corresponding signal having a proper voltage level to the pin PWM/ANADIM.

To sum up, the dimming controller 40$_a$ can provide the phase truncation (TRIAC) dimming, the PWM dimming, and the analog level dimming through proper external devices. Similarly, in FIG. 8, FIG. 9, and FIG. 10, priority order of affecting the current setting signal V$_{I-SET}$ is the signal of the pin PWM/ANADIM and the signal of the pin TRCDIM in sequence.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dimming driving system, comprising:
   a transformer having a primary winding and a secondary winding inductively coupled to each other, wherein the secondary winding is coupled between an output power line and secondary ground;
   a lighting device being powered by the output power line and the secondary ground; and
   a dimming controller coupled to the secondary winding for controlling current flowing through the lighting device according to a voltage drop of the secondary winding, the dimming controller comprising:
      a dimming phase detection circuit coupled to the secondary winding through a resistor for generating a digital signal according to the voltage drop of the secondary winding; and
      a reference signal providing circuit for providing a current setting signal according to the digital signal;
      wherein the current setting signal sets the current flowing through the lighting device.

2. The driving system of claim 1, further comprising:
   a current detector for detecting the current flowing through the lighting device to provide a current feedback signal;
   wherein the dimming controller comprises:
   a processing circuit coupled to the secondary winding for providing a current setting signal; and
   a feedback circuit for controlling the current according to the current feedback signal and the current setting signal.

3. The driving system of claim 1, wherein the reference signal providing circuit functions as a low-pass filter to filter the digital signal to generate the current setting signal.

4. The driving system of claim 1, wherein the dimming controller is an integrated circuit comprising:
   a phase truncation control pin coupled to the secondary winding through a resistor;
   a dimming control pin for receiving a dimming signal; and
   a processing circuit coupled between the phase truncation control pin and the dimming control pin for providing a current setting signal;
   wherein the current setting signal controls the current flowing through the lighting device.

5. The driving system of claim 4, wherein the phase truncation control pin has a sensing signal which influences the current setting signal, and priority of the dimming signal affecting the current setting signal is higher priority of the sensing signal affecting the current setting signal in the processing circuit.

6. The driving system of claim 4, wherein the dimming signal is an analog dimming signal or a pulse width modulation dimming signal.

7. The driving system of claim 4, wherein the dimming signal is an analog dimming signal and the dimming controller further comprises:
   a pulse width modulation dimming pin;
   a dimming phase detection circuit coupled between the phase truncation control pin and the pulse width modulation dimming pin for generating a digital signal according to the voltage drop of the secondary winding; and
   a reference signal providing circuit for providing the current setting signal according to the digital signal.

8. The driving system of claim 4, wherein the dimming control pin is coupled to an external filter capacitor.

9. The driving system of claim 1, wherein the lighting device comprises a plurality of light-emitting diodes.

10. A dimming controller formed in an integrated circuit chip, the dimming controller comprising:
    a phase truncation control pin coupled to a transformer for receiving a sensing signal;
    a dimming control pin for receiving a dimming signal; and
    a processing circuit coupled between the phase truncation control pin and the dimming control pin for providing a current setting signal, wherein priority of the dimming signal affecting the current setting signal is higher priority of the sensing signal affecting the current setting signal in the processing circuit;
    wherein the current setting signal influences current flowing through a lighting device.

11. The dimming controller of claim 10, wherein the dimming signal is an analog dimming signal and the dimming controller further comprises:
    a pulse width modulation dimming pin;
    a dimming phase detection circuit coupled between the phase truncation control pin and the pulse width modulation dimming pin for generating a digital signal according to a voltage drop of a secondary winding of the transformer; and
    a reference signal providing circuit for providing the current setting signal according to the digital signal.

12. The dimming controller of claim 11, wherein the current setting signal corresponds to an average value of the digital signal.

13. The dimming controller of claim 10, further comprising:
    a current feedback pin for receiving a current feedback signal which represents the current flowing through the lighting device; and
    a feedback circuit for controlling the current according to the current feedback signal and the current setting signal.

14. The dimming controller of claim 10, further comprising:

an output pin being driven by the feedback circuit, and coupled to an external photo coupler.

15. A dimming driving system, comprising:
a transformer having a primary winding and a secondary winding inductively coupled to each other, wherein the secondary winding is coupled between an output power line and secondary ground;
a lighting device being powered by the output power line and the secondary ground; and
a dimming controller coupled to the secondary winding for controlling current flowing through the lighting device according to a voltage drop of the secondary winding, and being an integrated circuit, wherein the dimming controller comprises:
  a phase truncation control pin coupled to the secondary winding through a resistor;
  a dimming control pin for receiving a dimming signal; and
  a processing circuit coupled between the phase truncation control pin and the dimming control pin for providing a current setting signal;
  wherein the current setting signal controls the current flowing through the lighting device.

16. The driving system of claim 15, wherein the phase truncation control pin has a sensing signal which influences the current setting signal, and priority of the dimming signal affecting the current setting signal is higher priority of the sensing signal affecting the current setting signal in the processing circuit.

17. The driving system of claim 15, wherein the dimming signal is an analog dimming signal or a pulse width modulation dimming signal.

18. The driving system of claim 15, wherein the dimming signal is an analog dimming signal and the dimming controller further comprises:
  a pulse width modulation dimming pin;
  a dimming phase detection circuit coupled between the phase truncation control pin and the pulse width modulation dimming pin for generating a digital signal according to the voltage drop of the secondary winding; and
  a reference signal providing circuit for providing the current setting signal according to the digital signal.

19. The driving system of claim 15, wherein the dimming control pin is coupled to an external filter capacitor.

* * * * *